RE 25644

April 19, 1960  S. O. LINDERHOLM  2,933,664
CAPACITOR COOLING

Filed May 16, 1957  2 Sheets-Sheet 1

INVENTOR.
SVEN O. LINDERHOLM
BY
Kenneth W. Miller
ATTORNEY

April 19, 1960   S. O. LINDERHOLM   2,933,664
CAPACITOR COOLING
Filed May 16, 1957   2 Sheets-Sheet 2
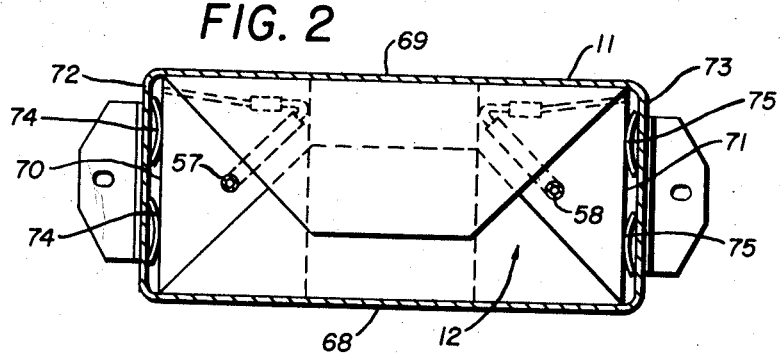
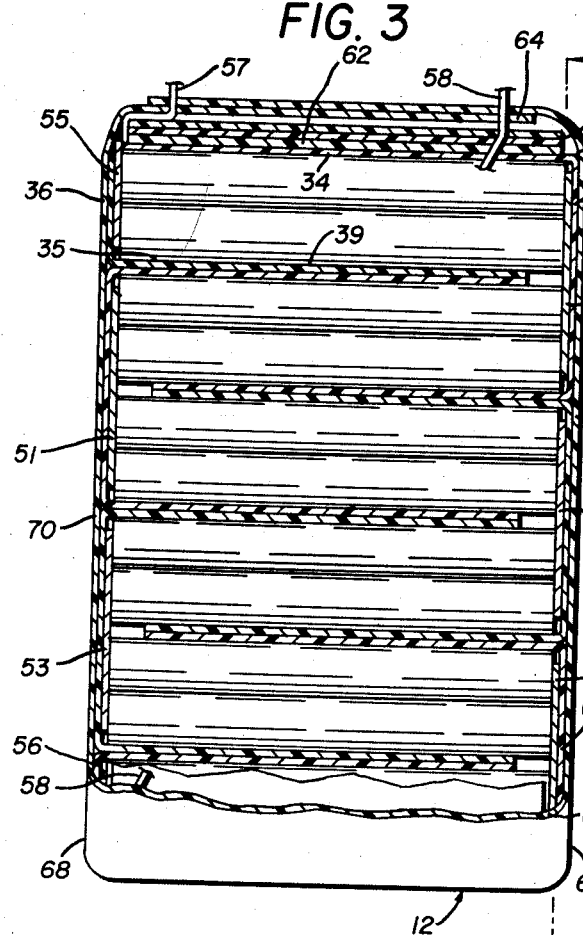
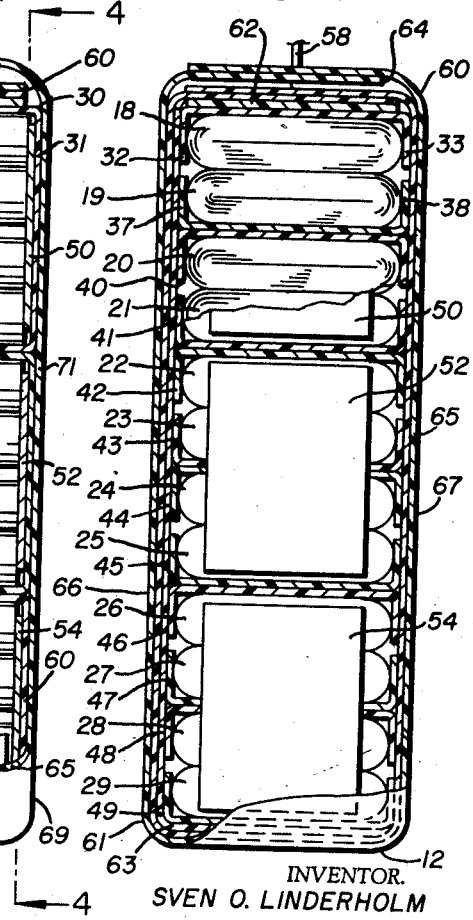
INVENTOR.
SVEN O. LINDERHOLM
BY
Kenneth W. Mueller
ATTORNEY

United States Patent Office 2,933,664
Patented Apr. 19, 1960

2,933,664

CAPACITOR COOLING

Sven O. Linderholm, Mansfield, Ohio, assignor to The Ohio Brass Company, Mansfield, Ohio, a corporation of New Jersey Application May 16, 1957, Serial No. 659,652

15 Claims. (Cl. 317—243)

This invention relates to capacitors and, more particularly, to high voltage energy storage and power capacitors.

The principal object of the invention is to reduce the operating temperatures of power capacitors and, particularly, of capacitors which are maintained in an energized condition over long periods of time.

Another object of the invention is to provide a capacitor construction in which the transmission of heat from the capacitor elements to the capacitor container is facilitated.

Still another object of the invention is to facilitate the manufacture of power capacitors and the like.

In the art pertaining to electric power transmission and distribution, it is known to connect capacitors in shunt across a distribution line to improve the power factor of the circuit or in series with a transmission line to modify the impedance of the line and increase the power handling capacity. In either instance, the capacitors are assembled in banks to constitute the aggregate capacity necessary to effectuate the required modification of the electrical characteristics of the line. Each of the capacitors ordinarily constitutes a metallic container or housing which encloses a number of capacitor elements with an oil or like impregnant surrounding the elements and with appropriate lead-through bushings for connecting the capacitor elements to the conductors of the external circuits. A bank of capacitors is ordinarily constituted of a plurality of such capacitors which are maintained upon suitable supporting frames or brackets adjacent the conductors or circuit elements to which they are connected.

Because of the physical association of the capacitors and the fact that substantial quantities of heat are generated by the capacitor elements of the individual capacitors, a considerable problem exists as to holding the operating temperatures of the capacitors at reasonable levels, particularly where the capacitors are connected in energized circuits for long periods of time. It is well known that the life of a given capacitor is a function of the operating temperature, but design changes directed toward reducing temperature by increase in size of the capacitors, are, of course, contrary to practical requirements.

The present invention mitigates the effect of the conflicting requirements thus imposed upon a power capacitor and there is disclosed and described herein, a power capacitor in which the heat transfer and radiating characteristics of the walls of the container are utilized to minimize the operating temperature of the capacitor elements. More particularly, a specific arrangement of the capacitor elements is set forth in which the favorable heat conductivity characteristics of the foil armatures of the capacitor elements are utilized for transmitting the internally generated heat to the walls of the container while providing electrically insulated connections and interconnections to the capacitor elements.

The capacitor elements are of the form of rolls or windings in which the foils of the two armatures extend beyond the insulating dielectric material at the opposite ends thereof. These capacitor elements are interconnected electrically by means of flat metallic plates which contact the foils at the ends of the capacitors adjacent the ends of the capacitor container and which function, also, as heat transmitting and stabilizing means. The interconnecting plates are arranged parallel to the end walls of the container and are placed in heat conductive relation thereto by means of spring metallic clips. Electrically insulating sheets are arranged between the plates and the clips, and by reason of the intimate mechanical engagement, permit transfer of internally generated heat from the foils and interconnecting plates to the clips and the end walls of the container. The sides of the capacitor elements are tightly engaged with the side walls of the container so that the large heat radiating areas of the sides of the container are utilized, by reason of direct conduction from the capacitor elements, as well as from the foils through the interconnecting plates and clips and the end walls of the container. The arrangement is useful, not only for reducing the overall temperature of the capacitor, but also for providing a desirable uniform distribution of heat within the capacitor and prevention of hot spots.

The invention, together with further objects, features and advantages thereof will be more clearly understood by reference to the following detailed specification and claims taken in connection with the appended drawing, in which Fig. 1 is a front elevation of a power capacitor with a portion of the side of the container broken away to show the arrangement of the capacitor elements in the container;

Fig. 2 is a section view taken in the direction 2—2 in Fig. 1 and illustrating, particularly, the arrangement and disposition of the corrugated spring clips referred to above;

Fig. 3 is a side elevation view of a capacitor pack, partly in section; and

Fig. 4 is an end view, partly in section, taken in the direction 4—4 in Fig. 3 showing the arrangement of the capacitor elements in the pack and the arrangement of the inter-connecting plates.

Figure 1:
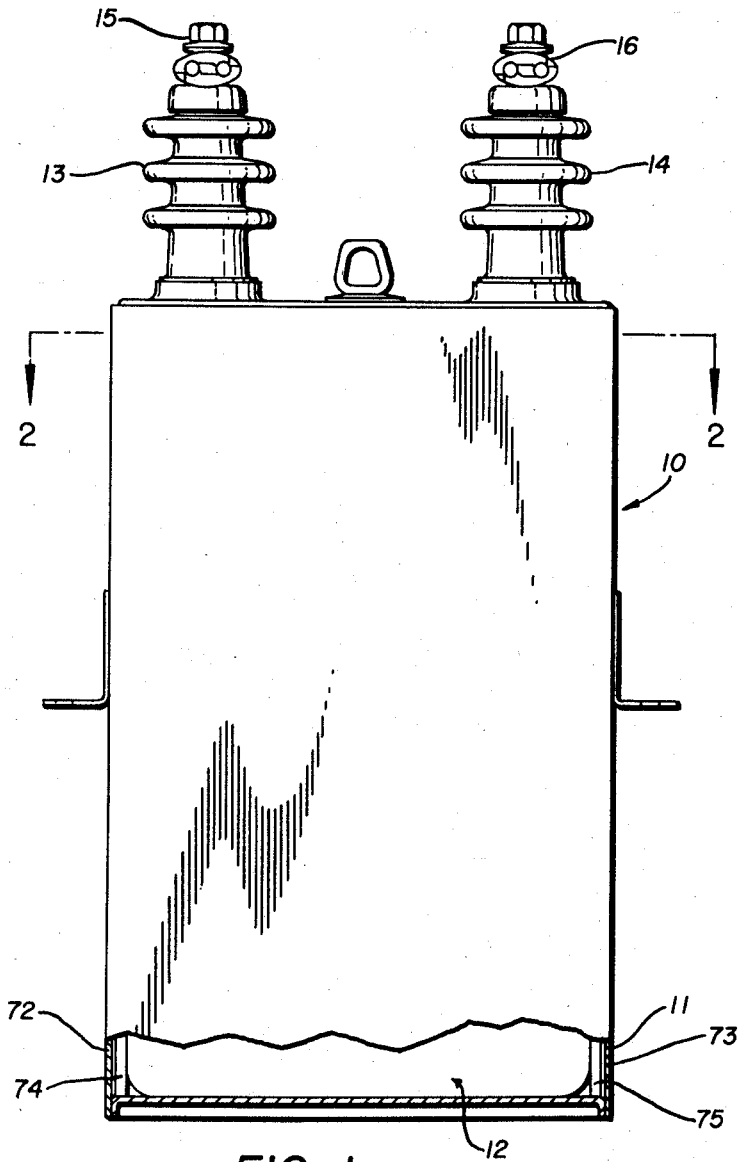

Referring now to Fig. 1, there is shown a capacitor 10 adapted for use in electric power circuits. The capacitor 10 comprises a sheet metal container 11, a capacitor pack 12 and two bushings 13 and 14 with terminals 15 and 16 which are connected to the elements of the capacitor pack. The container 11 and the bushings 13 and 14 are gas tight and the interior of the container is filled with a liquid dielectric impregnant such as chlorinated diphenyl.

As is shown in Figs. 3 and 4, the capacitor pack 12 incorporates a stack of capacitor elements 18 to 29 inclusive, each element comprising a wound condenser having two armature foils and an interposed dielectric in the form of sheets of electric paper. Each armature foil protrudes beyond the paper sheets at one end of the sheets so that the protruding foil serves as a terminal for the capacitor element. The exterior of the element is further wound with the dielectric paper to serve as an insulating means for the element.

The capacitor elements are separated in pairs by a plurality of paper separators. Thus, the capacitor elements 18 and 19 are enclosed by the separator 30 which has the portion 31 extending along the end of the elements, the portions 32 and 33 extending along the side of the element 18 and the portion 34 extending along the top of the element 18. The separator 35 cooperates with the separator 30 and has the end part 36 arranged about the end of the capacitor elements 18 and 19 opposite the portion 31 of the separator 30, the portions 37 and 38 extending along the sides of the capacitor element 19 and opposite the portions 32 and 33 of the separator 30 and the portion 39 extending along the bottom of the capacitor element 19. Similarly, the capacitor elements 20 and 21 are enclosed by the separators 40 and 41, the capacitor elements 22 and 23 by the separators 42 and 43, the capacitor elements 24 and 25 by the separators 44 and 45, the capacitor elements 26 and 27 by the separators 46 and 47 and the capacitor elements 28 and 29 by the separators 48 and 49.

There is arranged at the ends of the capacitor elements, between the armature foil and the end portions of the separators, a flat metallic connector plate for electrically interconnecting the capacitor elements. Thus, the plate 50 is arranged over the ends of the capacitor elements 18 and 19 and 20 and 21 within the end portions of the separators 30 and 41. Likewise, the plates 51, 52, 53 and 54 interconect the capacitor elements parallel by two's and the resultant parallel units in series. The plates 55 and 56 serve as terminals for the pack and are connected to the conductors 57 and 58 which are in turn connected to the terminals 15 and 16 of the bushings 13 and 14.

The stack of capacitor elements, separators and interconnecting plates is held by a pack retainer 60 which has the one end 61 thereof disposed at the bottom of the front side of the stack of elements and extends about the stack and two end boards 62 and 63 to fold about itself and terminate at the remaining end 64 at the top of the pack. The pack retainer is formed of pressboard and determines the overall height of the stack and, within the manufacturing tolerance, the capacitance of the pack. The end boards 62 and 63 prevent rounding about the top and bottom elements of the stack and, thus, more closely define the overall height of the stack, as well as insure access of the impregnant to all portions of the top and bottom capacitor elements.

The stack and retainer just described are provided with an insulating layer in the form of a wrapping 65 comprising a considerable number, e.g. 20 or more layers, of thin electrical paper. This wrapping provides an optimum electrical insulating medium between the capacitor elements of the pack and the metallic walls of the container. The wrapping is flexible enough to transfer the pressure from the springs to the connector plate, and does not substantially diminish the resistance to heat flow as compared with a single sheet of material of the same overall thickness. The wrapping is sealed at the top and bottom of the pack, as shown, e.g., in Fig. 2.

Referring now to Fig. 2, the pack 12 is arranged in the container 11 so that the side walls 66 and 67 of the pack are in close proximity to the side walls 68 and 69. Thus, there is some accommodation for lateral movement of the side walls due to temperature changes.

The end walls 70 and 71 of the pack are spaced from the end walls 72 and 73 just sufficiently to receive the spring metallic clips 74 and 75. The clips 74 and 75 are in the form of elongated arcuately formed pieces of spring steel or, alternately, as corrugated single pieces and the spacing between the end walls of the container and the end walls of the pack is sufficiently small so that the clips are substantially deformed or almost flattened when the pack and clips are inserted into the metallic container. The showing of Fig. 2 is somewhat exaggerated and more closely approximates the shape of the clips prior to assembly. These clips serve not only to maintain the plates 50—56 conclusively in intimate electrical and heat conductive engagement with the foil armatures at the ends of the capacitor elements, but also serve as heat transfer means for communicating heat energy from the plates 50—56 to the end walls 72 and 73 of the container. The spring clips are arranged so that the sharp edges are in contact with the container walls, and only smooth surfaces are in contact with the insulating paper wrapping.

The interleaved portions of the separators are spaced from the connector plates in order to insure the necessary contact pressure between the connector plate and the protruding foils of the capacitor elements. Thus, the end of the portion 39 of the separator 35 is spaced from the connector plate 50 and the spring pressure exerted by the clip 75 through the plate 50 is received directly on the foils at the ends of the capacitor elements 18, 19, 20 and 21.

It will be appreciated that, because of the high heat conductance of the armature foils, the flow of heat is accomplished much more readily through the foils, the connector plates, the ends of the separators, the pack wrapper and the spring clips to the end walls of the container, as compared with the transverse flow through the layered dielectric and foil sheets and through the separator, retainer and pack wrapper to the side walls of the container.

As a consequence of this fact, not only are the end walls of the container utilized as heat transfer means to the external atmosphere directly, but also for conductively transmitting the heat energy to the side walls of the container. By contrast, the constructions of the prior art utilized the heat transfer characteristics of the end walls principally by reason of conduction from the side walls. The arangements is of particular importance in reducing operating temperatures where large numbers of capacitors are arranged in closely spaced relationship side to side in capacitor banks so that the heat transfer from the side walls to the exterior atmosphere is greatly diminished.

It is of importance that the conductivity characteristics of the armature foils and of the arrangement of the connector plates in heat conductive relation to the foils of several capacitor elements greatly improve the heat distribution as between the capacitor elements and effectively prevents the development of excessive or hot-spot temperatures. Further, the large area of contact between the connector plates and the armature foils greatly reduces the contact current density, so that transient effects are effectively minimized. It will be appreciated, of course, that the arrangement greatly reduces the current density in the armature foils, particularly in the end portions thereof.

The arangement shown herein in which the capacitor elements are connected in series by two's is shown by way of example, and other series parallel combinations of capacitor elements may be readily accomplished without departure from the teachings of the inventor.

It is to be understod that the foregoing description is not intended to restrict the scope of the invention and that various rearrangements of the parts and modifications of the design may be resorted to. The following claims are directed to combinations of elements which embody the invention or inventions of this application.

I claim:

1. A power capacitor comprising a generally rectangular metallic container, a capacitor pack within the container having end walls thereof spaced from the end walls of the container, the said pack comprising a stack of horizontally disposed wound capacitor elements each having at least one armature foil projecting at an end thereof, a flat metallic connector plate at one end of the capacitor elements engaged with the armature foils and electrically interconnecting the capacitor elements and insulating material at least in part about the said elements and plates, and a spring metallic member interposed between the end walls of the pack adjacent the connector plate and the end walls of the container and engaged therewith.

2. A power capacitor comprising a generally rectangular metallic container, a capacitor pack within the container having the side walls thereof tightly engaged with the side walls of the container and the end walls spaced from the end walls of the container, the said pack comprising a stack of horizontally disposed wound capacitor elements each having at least one armature foil projecting at an end thereof, a plurality of flat metallic plates engaged with the armature foils at the ends of the capacitor elements electrically interconnecting the capacitor elements, insulating separators disposed between the capacitor elements and extending between the capacitor elements and about the exteriors of the plates for electrically separating and positioning the capacitor elements and connector plates and insulating sheet material about the exterior of the said elements, plates and separators, and spring metallic members interposed between the end walls of the pack and the end walls of the container and engaged therewith for compressively securing the several parts within the container and transmitting heat energy from the connector plates and sheet material to the walls of the container.

3. A capacitor comprising a generally rectangular metallic container, electric terminal means for the container, a plurality of capacitor elements in stacked insulated relation, each comprising a wound assemblage, including two armature foils and an interdispersed dielectric sheet with one armature foil protruding beyond the dielectric sheet at each end thereof and insulating means about the assemblage, at least one flat metallic piece at each end of the stack engaged with the armature foils of at least some of the capacitor elements of the stack, a sheet of insulating material arranged at least between the metallic plates and the walls of the container, a metallic spring member arranged between the insulating sheet and the side wall of the container, and electric circuit means electrically connecting the capacitor elements to the terminal means.

4. A capacitor comprising a generally rectangular metallic container, electric terminal means for the container, a plurality of capacitor elements in stacked insulated relation, each comprising a wound assemblage, including at least two armature foils and interdispersed dielectric sheets with at least one armature foil protruding beyond the dielectric sheets at each end thereof and insulating means about the assemblage, a plurality of flat metallic connector plates at each end of the stack, each engaged with the foil of one capacitor element and that of an adjacent capacitor element for electrically connecting the two capacitor elements, insulating material disposed between the metallic plates and the walls of the container at each end of the capacitor elements, and a transversely arcuate metallic spring member arranged between the insulating sheet and the side wall of the container, all for providing electroconductive contact pressure between the connector plates and armature foils and for facilitating transfer of heat energy from the capacitor elements to the wall of the container, and conductive means electrically connecting the capacitor elements of the stack to the terminal means.

5. The invention in accordance with claim 4, in which the connector plates engage the armature foils substantially over the entire transverse extent of the capacitor elements.

6. The invention in accordance with claim 4, in which the spring member has the edges thereof engaged with the end wall of the container and the arcuate portion engaged with the insulating material.

7. The invention in accordance with claim 4, in which four or more capacitor elements have the armature foils thereof engaged by a metallic plate for electrically connecting the capacitor elements in series-shunt relationship.

8. A capacitor comprising a generally rectangular metallic container, electric terminal means for the container, a plurality of capacitor elements in stacked insulated relation within the container, each capacitor element comprising a wound assemblage including two armature foils and an interdispersed dielectric sheet with one armature foil protruding beyond the dielectric sheet at each end thereof and insulating means about the assemblage, a plurality of flat metallic plates each engaged with the protruding armature foils of at least two of the capacitor elements at one end thereof for connecting the capacitor elements electrically in series, separator means comprising insulating material extending above and below the said two capacitor elements and between the metallic plate and the side wall of the container and terminating short of the remaining end of the capacitor, and a metallic spring member arranged between the insulating sheet and the side wall of the container, all for facilitating transfer of heat energy from the capacitor elements to the wall of the container and maintaining the members in compressively secured relation within the container, and a liquid dielectric impregnant within the container extending throughout the voids therein.

9. A capacitor pack, comprising a stack of horizontally disposed wound capacitor elements having the armature foils projecting at the ends thereof, a plurality of electrically insulating separators extending between the capacitor elements alternately in opposite directions and about the ends of the capacitor elements, a flat metallic connector plate disposed within each two separators having confluent end parts and engaged with the foils of the capacitor elements therein, and insulating means disposed about the entire said capacitor elements, separators, interconnecting plates and retainer.

10. A capacitor pack, comprising a stack of horizontally disposed wound capacitor elements having the armature foils projecting at the ends thereof, a plurality of electrically insulating separators extending between the capacitor elements alternately in opposite directions and about the ends of the capacitor elements, a flat metallic connector plate disposed within each two separators having confluent end parts engaged with the foils of the capacitor elements therein, a paper board retainer disposed about the sides and top and bottom of the capacitor elements, and insulating means comprising a plurality of sheets of electrical paper about the entire said capacitor elements, separators, interconnecting plates and retainer.

11. The invention in accordance with claim 10, in which the ends of the portions of the separators disposed between two capacitor elements is spaced from the connector plate interconnecting those two elements to insure contacting engagement of the connector plates with the armature foils.

12. The invention in accordance with claim 10, in which the stack of capacitor elements is vertically restrained by the retainer for controlling variations in the capacitance of the pack.

13. The invention is accordance with claim 12, in which rectangular paper boards are positioned between the end separators and the retainer for insuring the rectangularity of the capacitor stack at the top and bottom thereof.

14. The invention in accordance with claim 10, in which the connector plates electrically interconnect the capacitor elements in series parallel relationship.

15. The invention in accordance with claim 10, in which the plates engage the armature foils substantially over the entire transverse extent thereof.

References Cited in the file of this patent

UNITED STATES PATENTS

| | | |
|---|---|---|
| 1,850,105 | Higginbottom | Mar. 22, 1932 |
| 2,127,352 | Dubilier | Aug. 16, 1938 |
| 2,799,815 | Lockett | July 16, 1957 |

FOREIGN PATENTS

| | | |
|---|---|---|
| 945,105 | France | Apr. 26, 1949 |